United States Patent

Stalph

[15] 3,659,879

[45] May 2, 1972

[54] DUCT POSITIONER FOR THE CONTROL OF THERMAL EXPANSION

[72] Inventor: Gunter J. Stalph, Windsor, Conn.

[73] Assignee: Combustion Engineering, Inc., Windsor, Conn.

[22] Filed: July 16, 1970

[21] Appl. No.: 55,464

[52] U.S. Cl. ..........................................285/114, 285/227
[51] Int. Cl. ......................................................F16l 51/02
[58] Field of Search................285/114, 226, 227, 228, 229, 285/301, 300, 299

[56] References Cited

UNITED STATES PATENTS

| | | | |
|---|---|---|---|
| 2,314,776 | 3/1943 | Dittus et al. | 285/228 |
| 2,568,923 | 9/1951 | McNeary et al. | 285/114 X |
| 2,335,478 | 11/1943 | Bergman | 285/226 X |
| 2,661,963 | 12/1953 | Brown et al. | 285/114 |
| 2,960,354 | 11/1960 | Addie et al. | 285/228 |
| 2,667,370 | 1/1954 | Clarke | 285/301 |

FOREIGN PATENTS OR APPLICATIONS

| | | | |
|---|---|---|---|
| 1,358,270 | 3/1964 | France | 285/226 |

*Primary Examiner*—Thomas F. Callaghan
*Attorney*—Carlton F. Bryant, Eldon H. Luther, Robert L. Olson, John F. Carney, Richard H. Berneike, Edward L. Kochey, Jr. and Lawrence P. Kessler

[57] ABSTRACT

Described herein is a duct system for conducting heated fluids such as, for example, combustion gases from the interior of a vapor generator furnace, or the like. The duct system includes a toggle section connected to adjacent parts of the system by means of expansion joints thereby to accommodate relative displacements that will occur between the parts. Supporting structure for the toggle section is disclosed including lever mechanism so arranged as to control the extend of flexure in the respective expansion joints.

6 Claims, 4 Drawing Figures

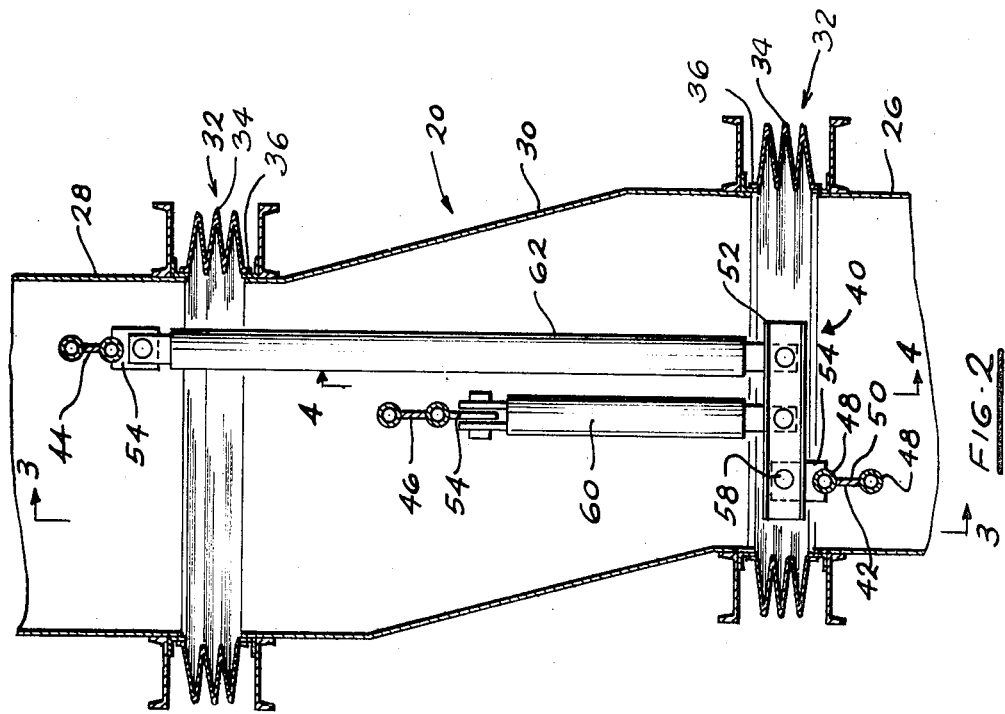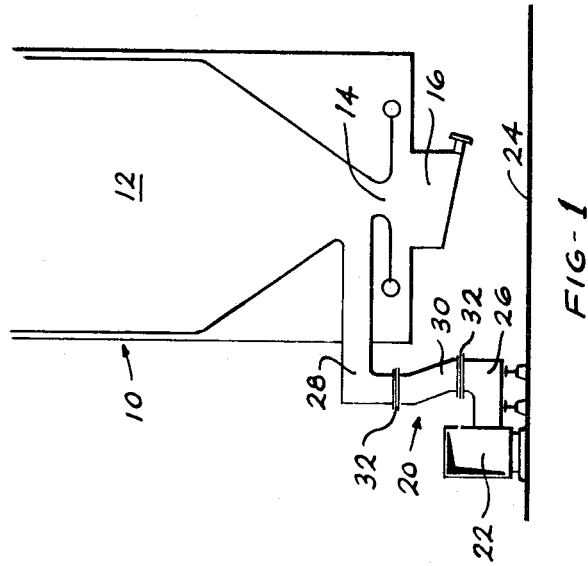
INVENTOR.
GUNTHER J. STALPH
BY John F. Carney
ATTORNEY

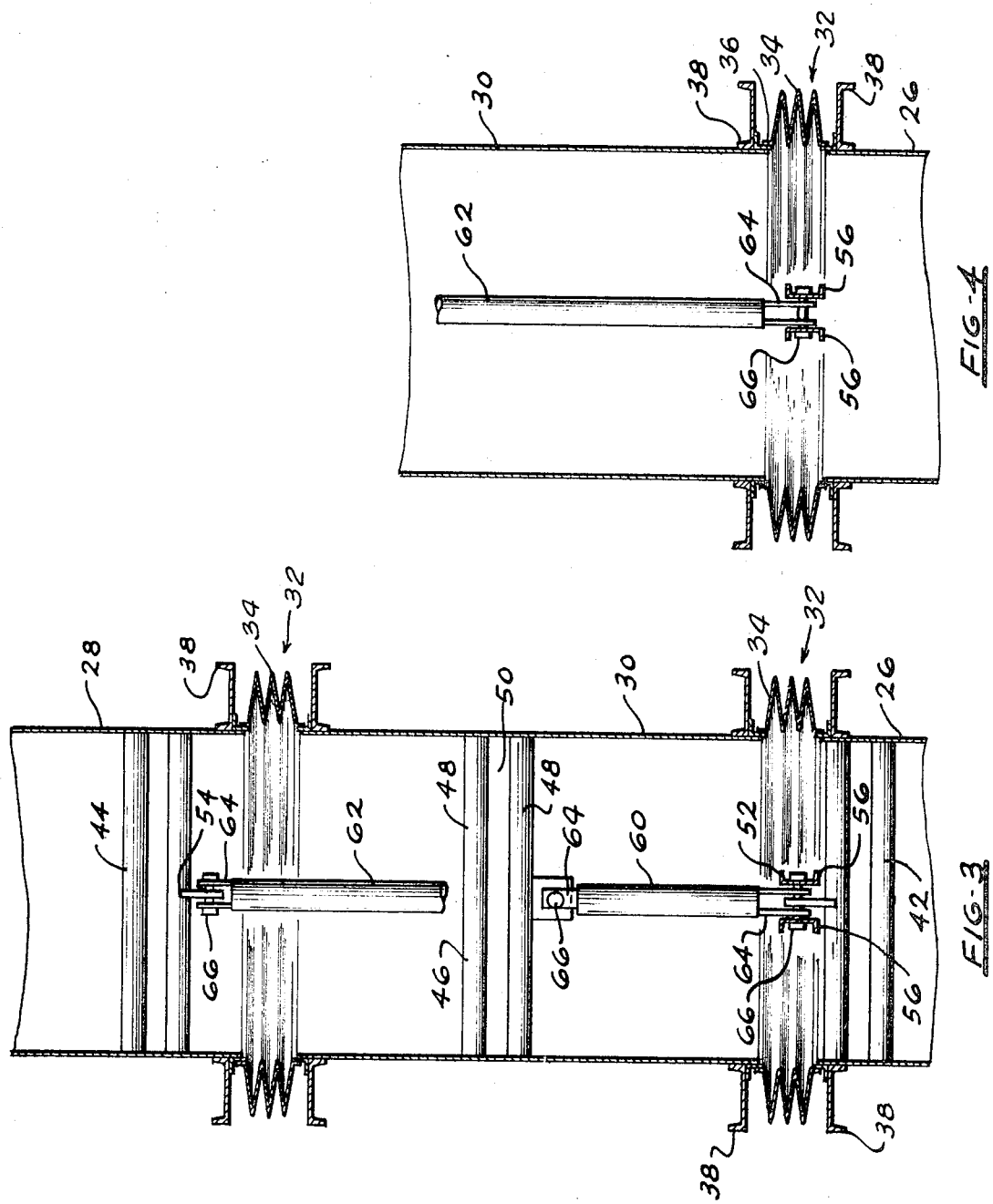

3,659,879

DUCT POSITIONER FOR THE CONTROL OF THERMAL EXPANSION

BACKGROUND OF THE INVENTION

In the design of vapor generating plants, or the like, sheet metal ducts are commonly employed to conduct gaseous fluids, such as combustion gasses or air from one part of the plant to another. A typical example is the duct system connecting the gas recirculation fan to the bottom of the vapor generator for the purpose of readmitting spent combustion gasses discharged from the furnace back into its interior for recirculation therethrough. Because the vapor generator and other component parts of the plant are independently mounted and subjected to different operating temperatures and/or pressure thereby to produce non-uniform thermal - or pressure-induced 113 displacements, the duct system employed to interconnect the various parts of the plant must be capable of accommodating the non-uniform relative movements that will occur. Because the movements often occur in more than one plane, the duct system must be capable of undergoing compound displacements otherwise known as "-toggling." For this reason, it is common practice in the design of vapor generating plants to include in the duct system, a section that is connected into the system by means of expansion joints that are intended to absorb these non-uniform displacements. This section, referred to as the toggle section, is most commonly connected into the duct system by means of bellows-type expansion joints in order to render the joints fluid tight while, at the same time, permitting relative movement between the parts.

In the past, it has been the practice to mount the toggle section between the parts of the duct system being connected by means of rigid hangers with the bellows joints connecting the ends of the toggle section to the adjacent ends of the ducts. In these arrangements, the relative displacements between the toggle sections and the connected duct ends are accommodated by the flexure of the expansion joints. Due to the possibility of settling out of particulate matter in the folds of the bellows, thus to reduce the flexibility of the affected joint, it is customary to provide each bellows with a sufficient number of folds to accommodate the total expected relative displacement.

As the size of vapor generators has increased, the duct systems have been caused to be subjected to greater amounts of thermal - and pressure-induced displacements. To accommodate these increased amounts of displacement, it has been necessary to design added flexure into the connections between the toggle section and the connected ducts. One way of accomplishing this has been to simply provide additional folds to each of the bellows joints. This however, has the disadvantage, in addition to increased cost, of significantly increasing the weight of the joint so as to impart a significant amount of flexure to the joint due solely to the added weight of the folds thereby requiring still more folds than would otherwise not be necessary.

An alternative manner of support involves supporting the toggle section by means of spring supports thereby permitting it to "float." Such floatability would, of course, increase the degree of relative displacements that could be accommodated by the joints, but these spring supported arrangements suffer from the disadvantage that the supports can be designed for only a single load condition. Thus, if load conditions change, such as for example a change in the pressure of the fluid being conducted by the duct system, then the system will be caused to go out of balance and thereby stresses will be imposed on the joints. An additional problem inherent in the use of spring supports is the fact that any so-supported toggle section would tend to continually vibrate, thus contributing undesirable fatigue stresses to the system and noise to the plant.

It is to the improvement of such systems, therefore, that the present invention is directed.

SUMMARY OF THE INVENTION

According to the present invention, mechanism is provided for supporting the toggle section of a duct system that is subjected to compound displacements due to relative movement between the components of the duct system connected by the toggle section. The mechanism includes a lever arm mounted for pivotal movement upon one of the connected duct sections and linkage means connecting the lever arm to the toggle section and to the other duct section respectively. The arrangement is such that the vertical loading created by the toggle section is carried by the mechanism.

Moreover, the arrangement of the lever mechanism is such as to controllably regulate the amount of flexure imparted to the respective expansion joints by movement of either of the connected system components. In keeping with this latter function, and as taught herein, through the use of the lever mechanism, any movement occurring in the respective system components will be transferred proportionately to the toggle section. By selectively disposing the connections between the linkage means and the lever arm so as to predeterminedly fix the extent of the lever arm defined between the respective links and the pivot point of the lever, movement of the toggle section can be regulated to control the amount of flexure experienced by the expansion joints.

According to a principal aspect of the invention therefore, there is provided means for distributing the flexure experienced by a plurality of expansion joints so as to controllably flex each of the joints and thereby reduce the number of folds required in each.

Moreover, by reducing the number of folds required in each expansion joint, design of the respective joints need not entail consideration of an appreciable amount of flexure experienced by the joint as a result of the weight of the bellows.

Still further, the present invention provides means for accommodating extensive relative movements in a duct system without the need of external spring hanger supports.

Furthermore, the invention provides a means for supporting the toggle section of a duct system subjected to component movements in which changes in system conditions can be readily accommodated.

BRIEF DESCRIPTION OF THE DRAWINGS

FIG. 1 is a schematic representation of a portion of a vapor generator organization in which the present invention is adapted for use;

FIG. 2 is an elevational section of a duct system in which the present invention is employed.

FIG. 3 is a n elevational section taken along line 3—3 of FIG. 2; and

FIG. 4 is an elevational section taken along line 4—4 of FIG. 2.

DESCRIPTION OF THE PREFERRED EMBODIMENT

Referring now to the drawings wherein like reference characters are employed throughout to designate like elements, FIG. 1 schematically illustrates a top supported vapor generator 10 including a downwardly expandable furnace 12 having a hopper bottom terminating in an ash discharge opening 14 that leads to an ash receptacle 16, or the like. Connecting with the lower end of the furnace 12 is a duct system 20, such as for example, the ducting employed to reinject combustion gases into the furnace of a unit employing gas recirculation. The duct system 20 includes a manifold 22 that is fixedly mounted upon the floor 24 and from which a floor supported manifold outlet duct section 26 emanates. The duct section 26 is caused to communicate with the furnace 12 by means of a furnace inlet duct section 28 that, at one end, penetrates the wall of the furnace and at the other end attaches to toggle section 30, which serves to interconnect the two duct sections. The duct sections 26 and 28 and the toggle section 30 in the disclosed arrangement, are preferably rectangular in cross-sectional shape although other shapes may be employed.

The connection between the end of toggle section 30 and the adjacent ends of the respective duct sections 26 and 28 in the disclosed embodiment is effected by means of bellows-type expansion joints 32 in order to effectively seal joints. It should be understood, however, that expansion joints other than those of the bellows-type may equally be adapted for use in the present invention. As shown in FIG. 2, the expansion joints 32 each comprise a flexible sheet metal bellows 34 containing a plurality of folds. The ends of the bellows are formed with upturned flanges 36 that are adapted for attachment as by means of welding, to appropriate framing elements here shown as rectangularly arranged structural members 38. In order to maintain the sealed integrity of the joints, the structural members 38 are welded along their abutting flanges to the exterior surface of the duct sections 26 and 28 and to the toggle section 30.

According to the present invention, means are provided to support the toggle section 30 in such a manner that the total extent of flexure imposed upon the respective expansion joints 32 by relative displacements between the connected pieces of equipment can be effectively proportioned between the respective joints so as to prevent the creation of stresses caused by overflexing of any single joint. As shown best in FIG. 2, the preferred arrangement of the invention comprises lever mechanism 40 internally mounted within the duct system 20 by the attachment of its component parts to strut members 42, 44 and 46 provided in the respective duct sections 26 and 28 and in toggle section 30. The strut members 42, 44 and 46 may comprise any conventional structural shape but in the present application they are each formed of a pair of parallel tubes 48 that are weldedly connected at their ends to opposed interior surfaces of the duct sections and the toggle section and are further interconnected along their length by a longitudinal web plate 50. Strut members of this configuration are provided in the present arrangement in order to more effectively permit passage of the flowing fluid through the region of the duct system occupied by the lever mechanism.

The lever mechanism 40 includes a lever arm 52 pivotally connected adjacent one end to a mounting plate 54 attached to the strut members 42 of duct 26. The lever arm 52 in the disclosed apparatus consists of a pair of oppositely facing channel members 56 that straddle the mounting plate 54 and are connected thereto by a pin connector 58 that extends through appropriate apertures in the channel members and mounting plate. Connecting the lever arm 52 to the toggle section 30 and to the other duct section 28 are a pair of links 60 and 62 that are pin connected at their opposite ends between the lever arm and mounting plates 54 attached to the respective strut members 44 and 46. Link 60 extends from an intermediate position along the length of the lever arm 52 to the mounting plate of strut 46 that is attached to the toggle section 30 while link 62 extends from a position adjacent the end of the lever arm opposite from the pivot pin 58 to the mounting plate of strut 44 attached to the duct 28. The links 60, 62 in the disclosed application of the invention are preferably formed as tubular members in order to impart columnar strength and rigidity to the apparatus. Each end of the links is provided with oppositely spaced flat projections 64 that each contain an aperture for reception of a connecting pin 66. At the upper end of each link, the pin 66 connects the projection 64 to the respective mounting plates 54, while at the lower end the projections are disposed between, and pin connected to the channel member 66 that form the lever arm 52.

The operation of the above-described apparatus is as follows:

Relative movements between the duct sections 26 and 28 will be caused to occur due to changes in temperature of the components of the vapor generator 10 or due to a change in pressure to fluid flow through the duct system 20. For example, any increase in temperature in the operating parts of the vapor generator 10, as for instance will occur when the unit is placed in operation, will result in a downward movement of the furnace inlet duct section 28 toward the manifold outlet duct section 26. With particular reference to FIG. 2, it will be evident that when such relative displacement occurs between duct sections 26 and 28, movements of the duct section 28 will produce a pivoting of the lever arm 52 due to the downward force provided by the action of the strut 44 upon link 62 which, in turn, acts upon the lever arm. Pivotal movement in the lever arm 52 will, in turn, cause link 60, which is connected to the strut 46, to draw the toggle section 30 downwardly.

Thus, while the initial downward movement of the duct section 28 would tend to cause a compressive flexure of the expansion joint 32 that connects this duct section to the toggle section 30, the operation of the lever mechanism 40 will effect a downward movement of the latter, thereby tending to expand the upper expansion joint and relieving the compressive flexure in that joint. The downward urging of the toggle section 30 will, of course, impart a corresponding compressive flexure in the lower expansion joint 32 that connects the toggle section with the duct section 26.

In the preferred embodiment of the invention, it is contemplated to arrange the lever mechanism 40 such that the pin connecting the lower end of link 60 to the lever arm 52 is positioned midway between the pivot pin 58 and the pin connecting the lower end of link 62. By means of this arrangement, expansion joint flexure resulting from relative displacements between the duct sections 26 and 28 will be equally divided between the two expansion joints 32.

It will be evident from an examination of the structure that other vertical movements in the system will be similarly accommodated. Thus, were the duct 28 to move upwardly the lever mechanism would operate to draw the toggle section 30 upwardly to relieve the tension flexure that would be generated in the upper expansion joint 32. On the other hand, were the lowered duct 26 to move upwardly, the lever mechanism 40 would operate to urge the toggle section 30 upwardly and similarly proportion the amount of flexure generated equally between the two expansion joints 32. This is in contradistinction to an arrangement in which the toggle section 30 is otherwise supported whereupon any movement between either duct and the toggle section would have to be accommodated solely by the expansion joint connecting the toggle section and the affected duct.

Although for the purposes of the disclosed application of the invention it is contemplated to locate the point of connection of the link 60 midway between the pivot pin 58 and the connection of link 62 thereby to equalize the degree of flexure to which the expansion joints are each subjected, it will be obvious that the amount of flexure imparted to the respective expansion joints can be otherwise proportioned by varying the effective length of the lever arm as by changing the position of the link connecting pins with respect to the pivot pin 58. It will thus be appreciated that, by means of the present invention there is provided apparatus that is effective to proportionate the amount of flexure to which the expansion joints of a duct system are subjected. By proportioning the flexure in this way, each of the expansion joints are required to accommodate less flexure than they would otherwise be subjected to thereby permitting the use of expansion joints of smaller size in a given application. It will further be appreciated that changes may be made in the disclosed arrangement without departing from the spirit of the invention. It is accordingly intended that all matter contained in the above description or shown in the accompanying drawings shall be interpreted as illustrative and not in a limited sense.

What is claimed is:

1. In a duct system for conducting heated fluids including spaced conduit sections, an intermediate toggle section and expansion joints for connecting the ends of the toggle section to the adjacent ends of the respective conduit section, means for supporting said toggle section comprising mechanism including:

a. means forming a pivot point fixedly attached to one of said duct sections;
b. a lever arm mounted for pivotal movement about said pivot point;
c. first link means extending between and interconnecting said lever arm and the other of said duct sections; and
d. second link means extending between an interconnecting said lever arm and said toggle section, the point of connection of said second link means to said lever arm being intermediate said pivot point and the point of connection of said first link means.

2. Apparatus as recited in claim 1 wherein said expansion joints are tubular.

3. Apparatus as recited in claim 2 wherein said tubular expansion joints are substantially the same size.

4. Apparatus as recited in claim 1 wherein the point of connection of said second link means to said lever arm is midway between said pivot point and the point of connection of said first link means.

5. Apparatus as recited in claim 1 including strut members extending transversely of the interior of each of said duct sections and said toggle section and wherein said pivot point and the points of connection of said link means to the respective duct and toggle sections reside on the respective strut members.

6. Apparatus as recited in claim 5 wherein said strut members each include a pair of oppositely spaced tubular members attached at their ends to the walls of said duct and toggle sections respectively, said tubular members being disposed in alignment in the direction of flow of fluid through said duct and toggle sections, and a plate forming a web interconnecting said tubular members.

* * * * *